United States Patent
Kajitani

[11] Patent Number: 6,151,195
[45] Date of Patent: Nov. 21, 2000

[54] MAGNETIC HEAD SLIDER SUPPORTING ASSEMBLY

[75] Inventor: Hiroshi Kajitani, Tokyo, Japan

[73] Assignee: NEC Corporation, Tokyo, Japan

[21] Appl. No.: 09/131,553

[22] Filed: Aug. 10, 1998

[30] Foreign Application Priority Data

Aug. 11, 1997 [JP] Japan ................................ 9-216739

[51] Int. Cl.⁷ .................................................. G11B 5/48
[52] U.S. Cl. ...................... 360/245.5; 360/246.4
[58] Field of Search ................................ 360/104, 245, 360/245.1, 245.3–245.7, 246.4

[56] References Cited

U.S. PATENT DOCUMENTS

| | | | |
|---|---|---|---|
| 5,687,479 | 11/1997 | Bennin et al. ............................. | 29/885 |
| 5,862,017 | 1/1999 | Kohira ..................................... | 360/104 |
| 5,901,014 | 5/1999 | Hiraoka ................................... | 360/104 |
| 5,973,882 | 10/1999 | Tangren .................................. | 360/104 |
| 6,002,550 | 12/1999 | Amemiya ................................. | 360/104 |

FOREIGN PATENT DOCUMENTS

| | | |
|---|---|---|
| 7-287952 | 10/1995 | Japan . |
| 8-77738 | 3/1996 | Japan . |
| 2544580 | 7/1996 | Japan . |
| 9-128919 | 5/1997 | Japan . |

OTHER PUBLICATIONS

Hamilton; "Contact Recording on Perpendicular Rigid Media"; Journal of Magnetics Society of Japan; vol. 15 Supplemental No. S2; (1991); pp. 483–490.

Primary Examiner—A. J. Heinz
Attorney, Agent, or Firm—Foley & Lardner

[57] ABSTRACT

A magnetic head slider is mounted on a slider mounting portion 204 supported by gimbal arms. Each gimbal arm is connected to a beam suspension. The gimbal arm on the side of the magnetic head is wider and shorter than the other gimbal arm. In a seek operation, vibration occurs close to an in-plane rotational movement centered at the gimbal arm, since the supporting rigidity of the gimbal arm is higher than that of the gimbal arm due to the difference in configuration between the gimbal arms. An amount of off-track of the magnetic head is relatively small, since it is mounted on the side of the gimbal arm.

10 Claims, 14 Drawing Sheets

MAGNETIC HEAD SLIDER SUPPORTING ASSEMBLY

BACKGROUND OF THE INVENTION

The present invention claims priority from Japanese Patent Application No.9-216739 filed Aug. 11, 1997, which is incorporated herein by reference.

1. Field of the Invention

The present invention relates to a magnetic disk device for contact recording/reproducing and, particularly, to a mechanism for supporting a magnetic head slider thereof

2. Description of Related Art

The recording density of a magnetic disk device has been increased on account of mainly the improvement of the magnetic characteristics of a magnetic head and a recording medium and the reduction of a distance between a gap of a magnetic head and a surface of a magnetic layer of a recording medium, that is, the so-called magnetic spacing. Nowadays, the magnetic spacing is in the order of 40 to 50 nm dependent upon the roughness of an air bearing surface of a flying head slider, a protection film on a magnetic recording medium, lubrication films and a surface roughness of a recording medium. However, in order to realize a recording density as high as 10~20 Gb per square inch or more, the magnetic spacing must be 15 nm or smaller. As one of means for realizing such small magnetic spacing, a slide type magnetic disk device for performing recording/reproducing operation while a magnetic head is in slide contact with a surface of a recording medium has been developed (cf. for example, H. Hamilton, Journal of Magnetic Society of Japan, Vol. 15, Supplement No. S2 (1991) 483 and Japanese Patent Application Disclosure Hei 5-508808). With such slide type magnetic disk device, it is possible to drastically reduce the distance between a magnetic head and a surface of a magnetic layer of a recording medium.

FIG. 1 is a cross sectional view schematically showing a basic construction of the conventional slide type magnetic disk device. In FIG. 1, the slide type magnetic disk device is constructed with a slide type magnetic head 7 for performing a recording/reproducing operation with respect to a magnetic recording medium 101, a magnetic head slider 1 on which the slide type magnetic head is mounted and a suspension leaf spring 106 for supporting the magnetic head slider and urging it to the magnetic recording medium. The suspension leaf spring 106 is connected through a positioning actuator arm 24 to a positioning actuator 102 for moving the slide type magnetic head 7 on the magnetic recording medium 101. The suspension leaf spring 106 presses the magnetic head slider 1 against the magnetic recording medium 102 by utilizing the elasticity of the whole leaf spring.

FIG. 2 is a disassembled perspective view of the magnetic head slider 1 and the suspension leaf spring 106, a portion of which is shown by cross section. In FIG. 2, a yoke 111 is buried in a contact pad 8 formed in a top end portion of the magnetic head 7 and performs a recording/reproducing operation with respect to the magnetic recording medium by slide contact therewith. An electric print cable 31 is directly formed on the suspension leaf spring 106.

Although the suspension leaf spring 106 in the above mentioned conventional magnetic disk device is a single leaf spring, a slide type magnetic disk device equipped with a gimbal mechanism has been also developed in order to improve the tracking of the suspension spring with respect to the magnetic recording medium. FIG. 3 is a cross section showing a basic construction of an example of the latter suspension spring, in which components similar to those shown in FIG. 1 are depicted by the same reference numerals, respectively. In FIG. 3, a magnetic head slider supporting mechanism is constructed with a gimbal 121 for supporting a magnetic head slider 1 and a beam suspension 6 for supporting the gimbal and applying a load to a magnetic head 7.

Incidentally, when the magnetic head seeks on the magnetic recording medium, the magnetic head slider supporting mechanism is required to have high rigidity in a width direction of a recording track and have strength enough to withstand frictional force and viscose fluid force generated between the magnetic head slider and a lubricant film on the surface of the magnetic recording medium. Further, in order to make it possible for the magnetic head slider to track the magnetic recording medium in contact therewith or with a minute distance therebetween, the magnetic head slider is required to have a flexibility suitable to allow a rolling (rotary movement about an axis parallel to a running direction of the magnetic recording medium) and a pitching (rotary movement about an axis orthogonal to the running direction of the magnetic recording medium and parallel to a surface of the magnetic recording medium) of the magnetic slider.

If, among the two contradictory requirements, the flexibility of the magnetic head slider is made prior to the other, the rigidity for the in-plane vibration mode and the primary and secondary torsional vibration modes of the whole suspension is lowered. Therefore, the vibration amplitude is increased and resonance frequencies of the respective modes are lowered. Since these vibration frequencies exist outside the controllable range, these frequencies appear as an off-track of the recording/reproducing head with respect to data track recorded on the recording medium. Therefore, it is impossible to record/reproduce the data until the vibrations in these modes excited by an access operation are sufficiently attenuated, so that a high speed access becomes impossible. Further, since vibration due to external disturbance other than the access operation resides as an off-track in a track follow state, a high speed and high density recording/reproducing becomes impossible.

On the other hand, if the rigidity of the magnetic head slider is made prior to the flexibility thereof, the tracking characteristics of the magnetic head slider with respect to the magnetic recording medium is degraded. Therefore, the sliding characteristics of the contact face of the magnetic head slider with respect to the surface of the magnetic recording medium becomes unstable and abrasion is enhanced, resulting in that the HDI reliability is lowered and the error rate is degraded by a variation of the recording/reproducing signal intensity due to an increase of jumping of the magnetic head slider.

SUMMARY OF THE INVENTION

An object of the present invention is to provide a slide type magnetic head slider support mechanism which can be positioned at high speed and with high accuracy in a width direction of the recording tracks of a magnetic recording medium and has superior tracking characteristics with respect to the magnetic recording medium.

According to a first aspect of the present invention, a magnetic head slider support mechanism comprises a gimbal portion for supporting a magnetic head slider constructed such that at least a portion of the magnetic head slider is made in contact with a magnetic recording medium when a recording/reproducing is performed with respect to the magnetic recording medium and a beam suspension portion formed integrally with the gimbal portion for supporting the gimbal portion and applying a load to the magnetic head slider, wherein vibration generated in the gimbal portion and having a fulcrum at a mounting position of the magnetic head slider on which the magnetic head is mounted is dominant.

According to a second aspect of the present invention, a magnetic head slider support mechanism comprises a gimbal portion for supporting a magnetic head slider constructed such that at least a portion of the magnetic head slider is made in contact with a magnetic recording medium when a recording/reproducing is performed with respect to the magnetic recording medium and a beam suspension portion formed integrally with the gimbal portion for supporting the gimbal portion and applying a load to the magnetic head slider, wherein the gimbal portion includes a slider mounting portion for mounting a magnetic head slider, gimbal arm portions for supporting the slider mounting portion and a gimbal frame for supporting the gimbal arm portions and connecting the gimbal arm portions to the beam suspension portion, the gimbal arm portions extending outward from opposite sides of the slider mounting portion, respectively, the gimbal arm portion provided on the side of the magnetic head mounting portion including a single gimbal arm having one end connected to the magnetic head mounting portion of the slider mounting portion and the other end connected to the gimbal frame and the gimbal arm portion provided on the side of the slider mounting portion opposite to the magnetic head mounting portion including a plurality of gimbal arms each thinner and longer than the gimbal arm portion provided on the side of the magnetic head mounting portion.

In the construction of the magnetic head slider support mechanism according to the second aspect of the present invention, the gimbal frame includes a gimbal frame top connected to the gimbal arm portion provided on the side of the magnetic head mounting portion, a gimbal frame base for connecting the gimbal arm portion provided on the side of the slider mounting portion opposite to the magnetic head mounting portion and the beam suspension portion and gimbal frame arms for connecting the gimbal frame top and the gimbal frame base, flexual rigidity of center portions of the gimbal frame arms being preferably small.

In the construction of the magnetic head slider support mechanism according to the first or second aspect of the present invention, the gimbal portion and the beam suspension portion except the magnetic had slider and the electric print cable have substantially uniform thickness of 30 μm or less and a distance between a mounting center of the magnetic head slider and a top of the positioning actuator arm is 7.5 mm or less and, preferably, 5 mm or less.

Preferably, at least one of the gimbal arm portions is bent such that a surface of the slider mounting portion protrudes from a surface of the gimbal frame to the side of the magnetic head slider.

At least one slit may be formed in the gimbal frame. In such case, an inside portion of the slit of the gimbal arm portion and/or the gimbal frame may be bent such that a surface of the slider mounting portion protrudes from a surface of the gimbal frame to the side of the magnetic head slider.

The electric print cable for receiving/sending electric signal with respect to the magnetic head may be directly formed on the beam suspension portion.

It is preferable that the beam suspension portion is connected to the positioning actuator arm such that the beam suspension portion becomes substantially parallel to the surface of the magnetic recording medium.

The magnetic head slider support mechanism mentioned above can be used in a magnetic disk device which includes a magnetic recording medium, a magnetic head for performing a recording/reproducing operation with respect to the magnetic recording medium, a magnetic head slider for mounting the magnetic head, the magnetic head slider being constructed such that at least a portion thereof is in contact with the magnetic recording medium when the recording/reproducing is performed with respect to the magnetic recording medium, a magnetic head slider support mechanism for supporting the magnetic head slider and drive means for moving the magnetic head on the magnetic recording medium.

DETAILED DESCRIPTION OF THE PREFERRED EMBODIMENTS

Figure 4:
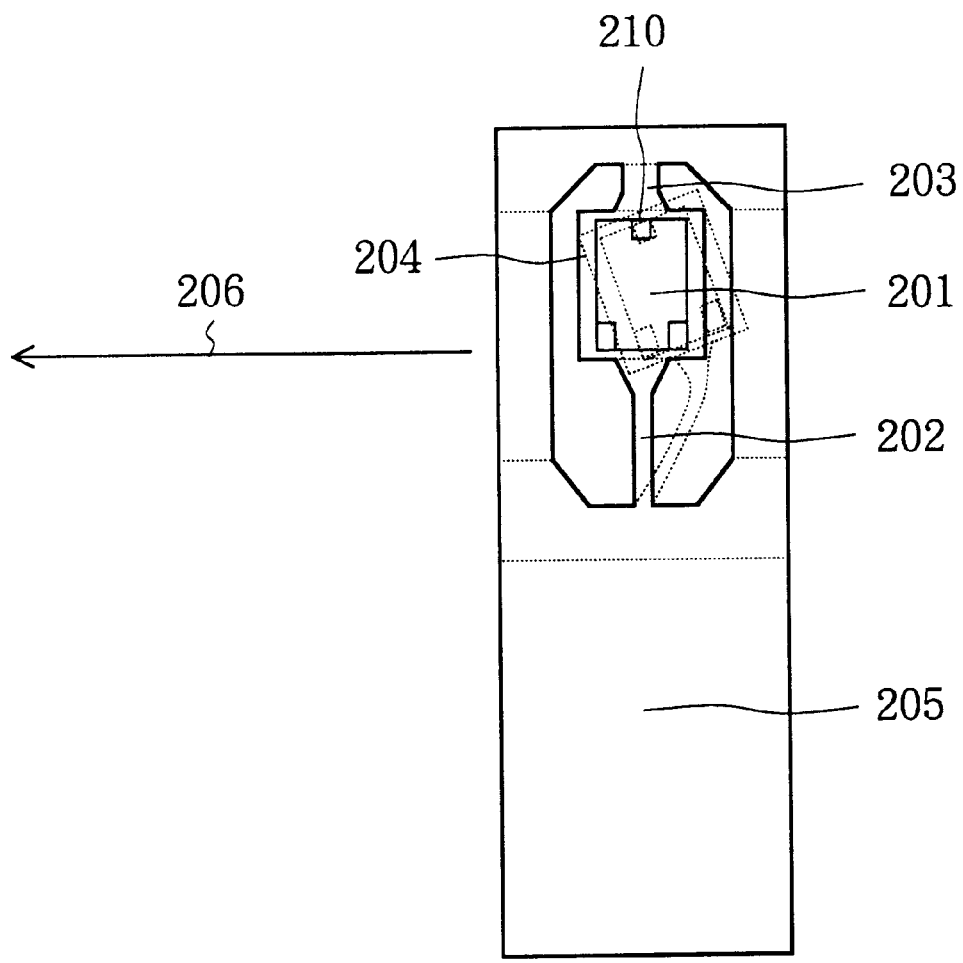
FIG. 4 is a bottom view of a magnetic head slider support mechanism according to the present invention, showing a basic construction thereof.

In FIG. 4, which is a bottom view schematically showing a basic construction of a magnetic head slider support mechanism of a slide type magnetic disk device according to the present invention, a magnetic head slider 201 is bonded to a lower surface of a slider mounting portion 204 which mounts a magnetic head 210 and is supported by one end of gimbal arms 202 and 203 which have their other end connected to a beam suspension 205. The gimbal arm 203 is wider and shorter than the gimbal arm 202. In such structure, when a seek operation is performed in the magnetic disk device, the magnetic head slider 201 is applied with a force in a direction shown by an arrow 206. In such case, since a supporting rigidity of the gimbal arm 203 is higher than that of the gimbal arm 202 due to the difference of configuration between them, an amount of deformation of the gimbal arm 203 in the seeking direction is smaller than that of the gimbal arm 202 and, therefore, vibration of the magnetic head slider 201 excited by the seek operation becomes nearly an in-plane circular movement having the gimbal arm 203 as a center. Since the magnetic head 210 is mounted on a portion of an upper surface of the magnetic head slider 201, which is on the side of the gimbal arm 203, an amount of off-track becomes small relatively. In a tracking operation, it is also possible to reduce an amount of off-track caused by various vibration modes since rotation centers of both pitching and rolling of the magnetic head slider 201 are close to the magnetic head 210.

In order to make vibration having a fulcrum at the magnetic head mounting position dominant, it is enough to make the rigidity of one gimbal arm higher than that of the other gimbal arm. In order to increase the rigidity of the one gimbal arm compared with the other, it is enough to make the one gimbal arm shorter and/or thicker than the other and/or use a different material providing a higher rigidity to the one gimbal arm from a material of the other gimbal arm. Instead of increasing the rigidity of the one gimbal arm, it may be possible to reduce the rigidity of the other gimbal arm.

Figure 5:
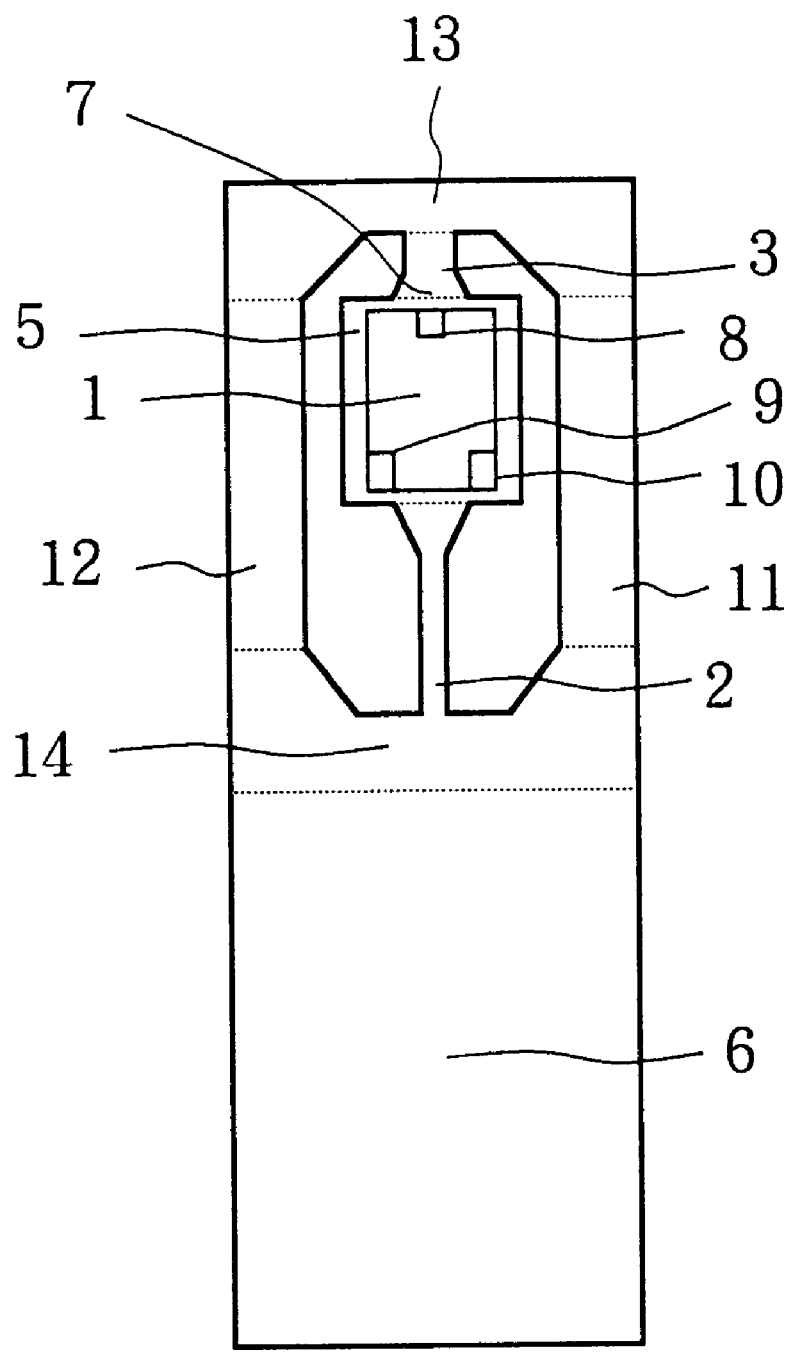
FIG. 5 is a bottom view of a magnetic head slider support mechanism according to a first embodiment of the present invention.

A first embodiment of the present invention will be described with reference to FIG. 5. In a slide type magnetic head slider 1 shown in FIG. 5, only three contact pads 8, 9 and 10, which are provided on a lower surface of the magnetic head slider 1, are in slide-contact with a surface of a magnetic recording medium. Similarly to the flying type slider which has been used usually, a magnetic head 7 is provided on a portion of an upper surface of the slide type magnetic head slider 1, which is on the side of the contact pad 8, with a top end of a magnetic sensor portion of the magnetic head 7 being within the contact pad 8. The slide type magnetic head slider 1 is bonded by an adhesive to a lower surface of a slider mounting portion 5. Leads of an electric print cable which are not shown are derived from an upper surface of the magnetic head 7. The slider mounting portion 5 is supported by gimbal arms 2 and 3 having different lengths and widths. The gimbal arms 2 and 3 are in turn supported by a gimbal frame base 14 and a gimbal frame top 13, respectively. The gimbal frame base 14 and the gimbal frame top 13 are in turn supported by gimbal frame arms 11 and 12 to form a gimbal frame 15 and the gimbal frame 15 is supported by a beam suspension portion 6, resulting in a slider support suspension having an integral structure except the slide type magnetic head slider 1 and the magnetic head 7. As shown in FIG. 5, the gimbal arm 3 which is closer to the contact pad 8 connected to the magnetic head is wider and shorter than the gimbal arm 2 which is closer to the other contact pads 9 and 10 so that the rigidity of the gimbal arm 3 becomes higher than that of the gimbal arm 2. Therefore, vibration amplitude of the contact pad 8 is restricted compared with vibration amplitude of the contact pads 9 and 10 and it is possible to obtain a slide type magnetic head slider support mechanism whose jumping is small, whose vibration in the track width direction is small, and which is advantageous in view of high recording density.

Figure 6:
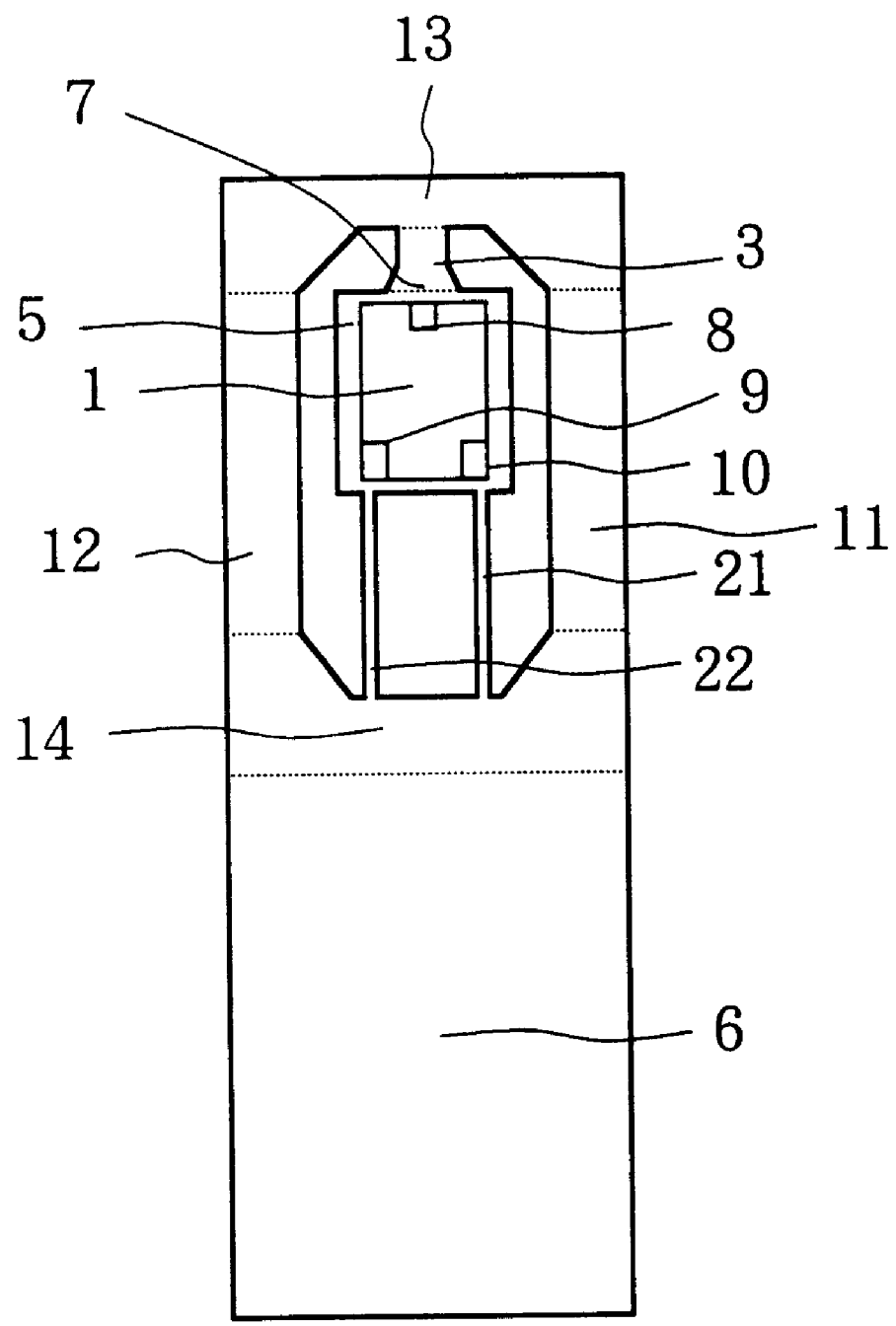
FIG. 6 is a bottom view of a magnetic head slider support mechanism according to a second embodiment of the present invention.

FIG. 6 is a bottom view of a second embodiment of the present invention, which is constructed with similar components to those shown in FIG. 5, with these components being depicted by the same reference numerals as those used in FIG. 5, respectively. The second embodiment shown in FIG. 6 differs from that shown in FIG. 5 in that a pair of parallel gimbal arms 21 and 22 which are directly connected to the back side of contact pads 9 and 10 are provided in lieu of the single gimbal arm 2 shown in FIG. 5. With such construction, it is possible to more effectively separate and attenuate vibration caused by the contact pads 9 and 10 which are away from the magnetic head and hence to realize a high density recording.

Figure 7:
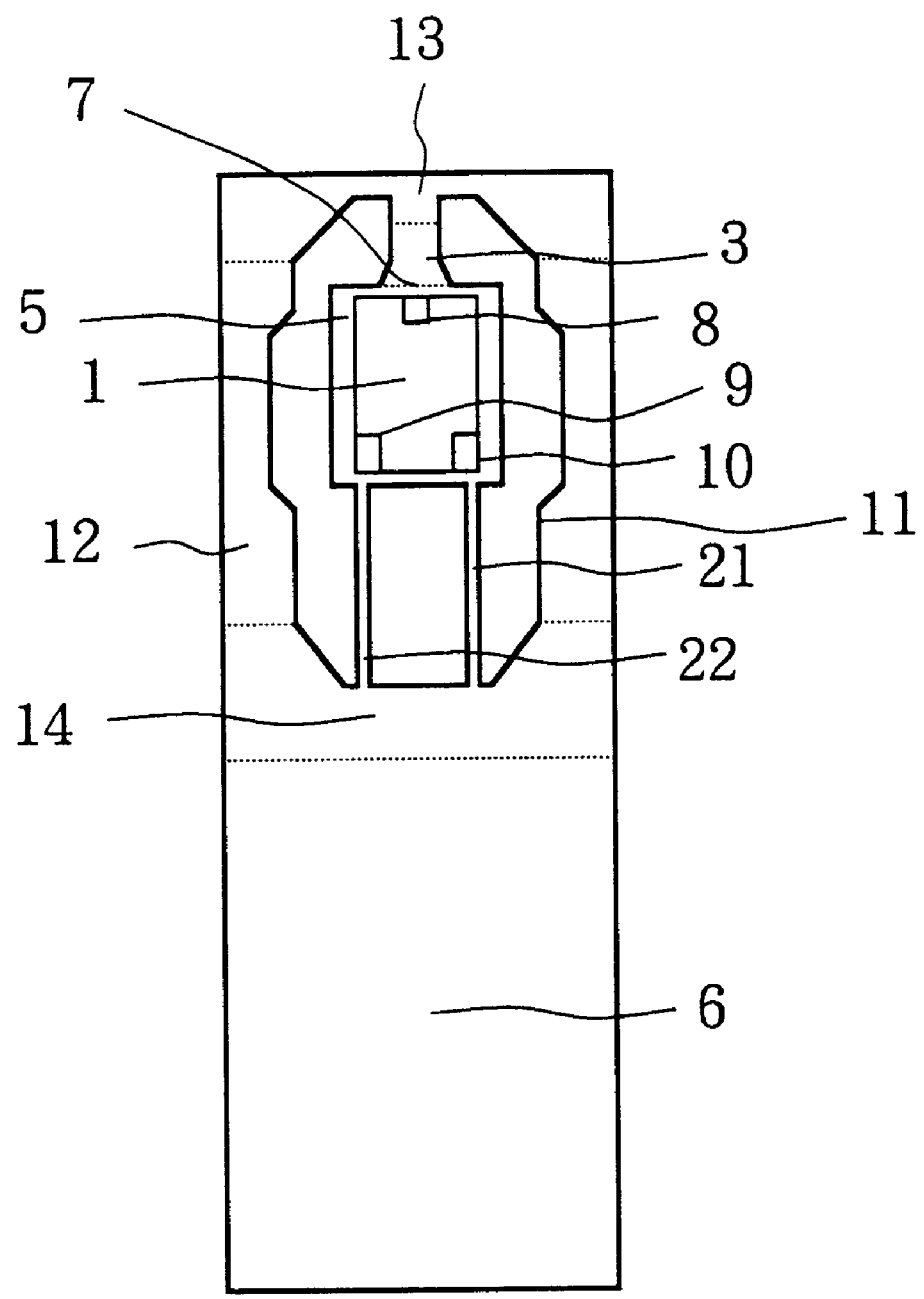
FIG. 7 is a bottom view of a magnetic head slider support mechanism according to a third embodiment of the present invention.

FIG. 7 shows a third embodiment of the present invention, which differs from the second embodiment shown in FIG. 6 in that center portions of gimbal frame arms 11 and 12 which connect a gimbal frame top 13 and a gimbal frame base 14 are narrowed compared with other portions thereof. Since, when a load is applied to a magnetic head slider 1, an amount of flexure of the gimbal arms can be regulated by utilizing deformation of the narrow center portions of the gimbal frame arms 11 and 12, it is possible to restrict a plastic deformation of the gimbal arms 3, 21, 22 due to stress concentration in the gimbal arms.

Figure 8:
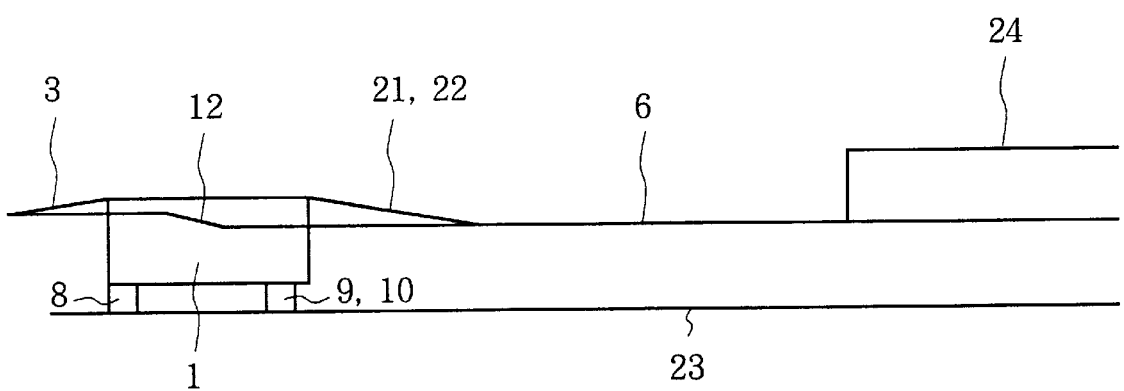
FIG. 8 shows a deformation of a suspension portion in a state in which the present slide type magnetic head slider support mechanism is actually assembled in a magnetic disk device.

FIG. 8 is a schematic side view of the slide type magnetic head slider support mechanism assembled in a magnetic disk device, showing a deformation of the suspension portion thereof. Since the slider fulcrum of the suspension can be made closer to a gravity center of the slider in the thickness direction by reducing the flexural rigidity of the center portions of the gimbal frame arms as shown in FIG. 7 and by allowing a deformation of the gimbal frame arms as shown in FIG. 4, it is possible to reduce a moment of inertia applied to the slider in a roll direction thereof compared with a case where the suspension supports the slider in the plane as a back surface (opposite to the air bearing surface) of the slider. As a result, it becomes possible to restrict a torsional vibration of the beam suspension portion.

Figure 9:
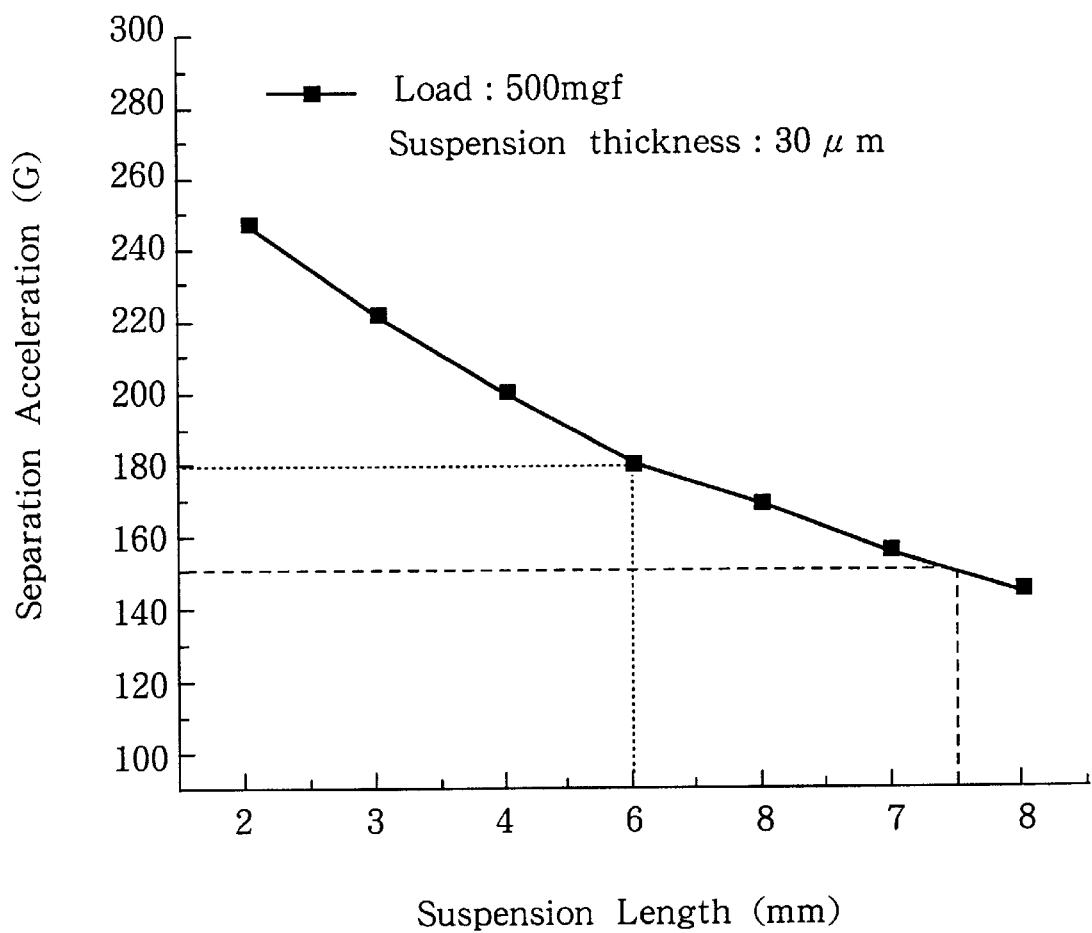
FIG. 9 is a graph showing a characteristics of the slide type magnetic head slider support mechanism according to the present invention.

FIG. 9 is a graph showing a relation between the length of the suspension and a separating acceleration of the slide type magnetic head slider from the magnetic recording medium with inertial mass of the suspension portion as a parameter, wherein the slider is a 30% pico slider of $Al_2O_3$-TiC, whose weight is about 1.6 mg, the magnetic head slider support mechanism has the configuration shown in FIG. 5, the width of the suspension is 2 mm, and the material of the suspension is stainless steel. The criterion of the separating acceleration with which the surface of the magnetic recording medium having an aluminum substrate is not damaged by the 30% pico slider of $Al_2O_3$-TiC is about 180 G. Further, it is preferable in order to obtain a flexible gimbal rigidity to use the suspension having a thickness of 30 µm or less. Considering the load of 500 mgf in view of the antiabrasion characteristics, the length of the suspension has to be about 5 mm or less. In a case where the separating acceleration of up to 150 G is allowable by considering a reduction of mass of the slider as a unit and a vitrification of the substrate of the magnetic recording medium, the suspension, which does not require a flange bending, has to have a thickness of 30 μm or less and a length of about 7.5 mm or less.

Figure 10:
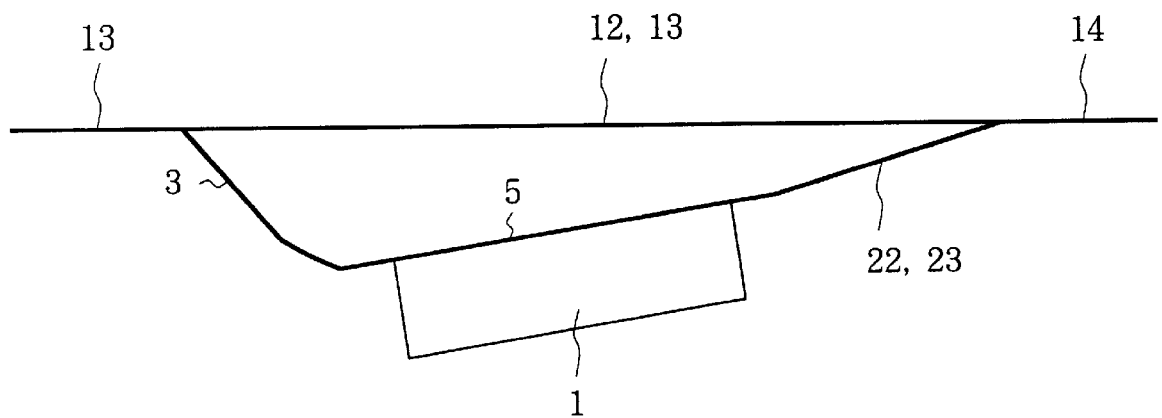
FIG. 10 shows a modification of a gimbal arm portion of the magnetic head slider support mechanism according to the present invention, in which the gimbal arms are bent such that the gimbal arm is convex on its side on which the slider is mounted.

FIG. 10 is a side view of another embodiment of the present invention, which differs from the embodiment shown in FIG. 6 in that a gimbal arm 3 on the side of a gimbal frame top 13 is bent down such that the gimbal arm 3 becomes convex downward. In this embodiment, it is possible to increase the load exerted on a contact pad 8 connected to the magnetic head 7 relatively to that exerted on other contact pads and hence to further reduce the jump-up of the contact pad. Since a balance of load exerted on the contact pads adjacent to the gimbal arms can be changed by bending the gimbal arm in this manner, it is possible to optimize the sliding of the contact pads of the slide type magnetic head slider with respect to the magnetic recording medium without requiring a change of the basic configuration of the magnetic head slider.

Figure 11:
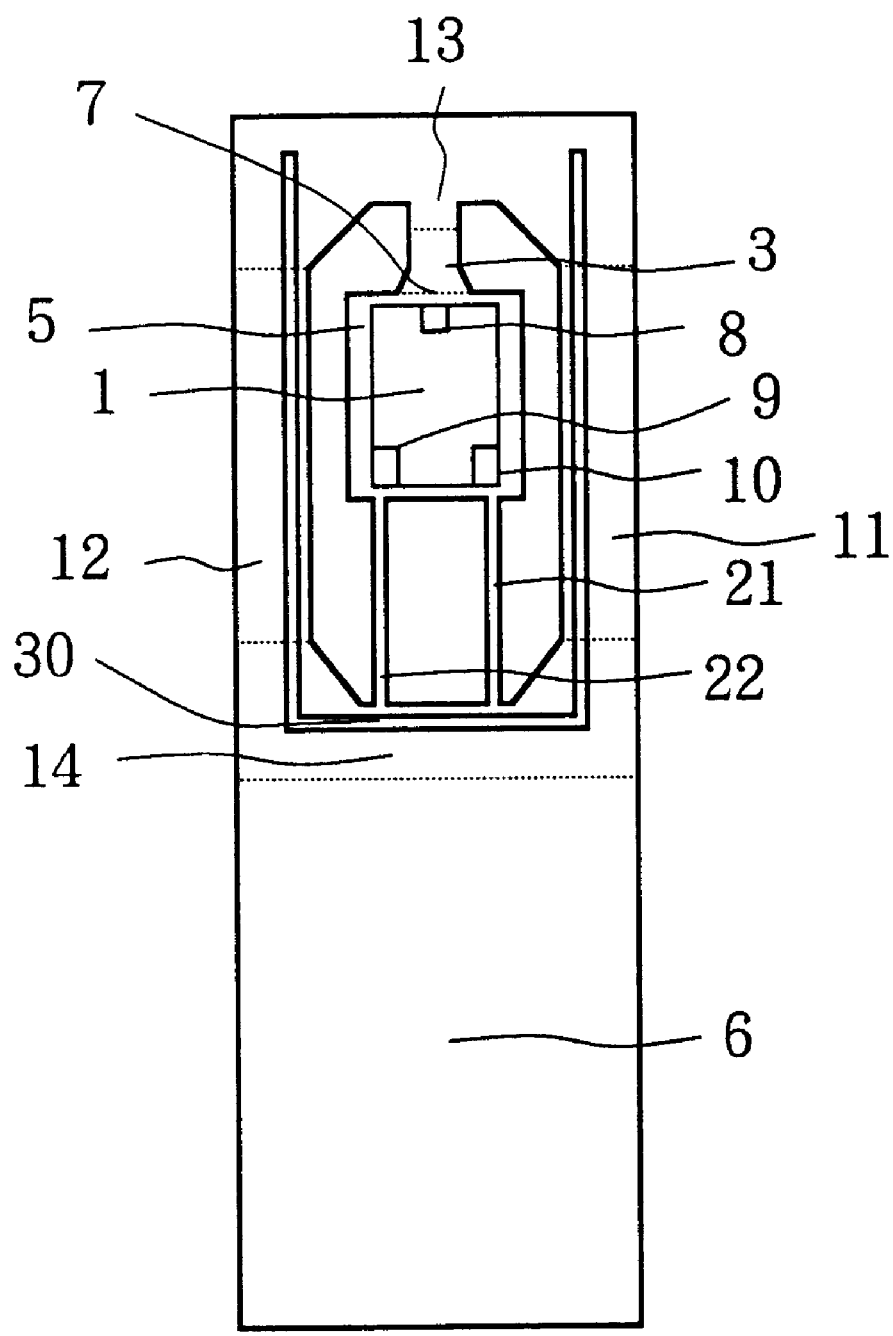
FIG. 11 is a bottom view of a modification of the magnetic head slider support mechanism shown in FIG. 7, which is formed with a gimbal frame portion in which a slit is formed.

FIG. 11 is a bottom view of another embodiment of the present invention, which differs from the embodiment shown in FIG. 6 in that a U-shaped slit 30 is formed in a gimbal frame portion. The slit 30 extends from one side portion of a gimbal frame top 13 along a gimbal frame arm 11, a gimbal frame base 14 and a gimbal frame arm 12 to the other side portion of the gimbal frame top 13. Since, with this construction, the flexibility of the gimbal spring is improved and a variation of load exerted on the slider with a variation of height of a mounting position of the suspension with respect to the positioning actuator can be restricted, it is possible to widen the tolerance related to the assembling of the magnetic head slider support mechanism. Further, although not shown, the same effect can be obtained by providing a pair of U-shaped parallel slits each similar to the slit 30 shown in FIG. 1.

Figure 12:
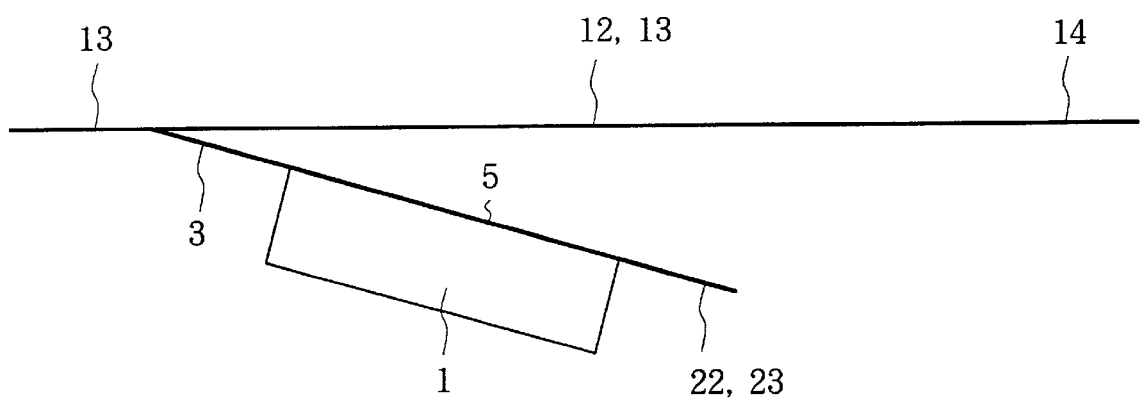
FIG. 12 is a side view of the magnetic head slider support mechanism when the gimbal frame shown in FIG. 11 is bent along a line A—A of the slit portion in the gimbal frame.

FIG. 12 is a side view of the embodiment shown in FIG. 11, with the gimbal frame top 13 being bent along a line A—A in FIG. 11 to preliminarily decline the slider mounting portion 5. In this embodiment, since the slider can be loaded in the state where the suspension portion is kept horizontal and a clearance can be kept between the surface of the magnetic recording medium and the suspension portion, this embodiment is advantageous in reducing the thickness of the slider.

Figure 13:
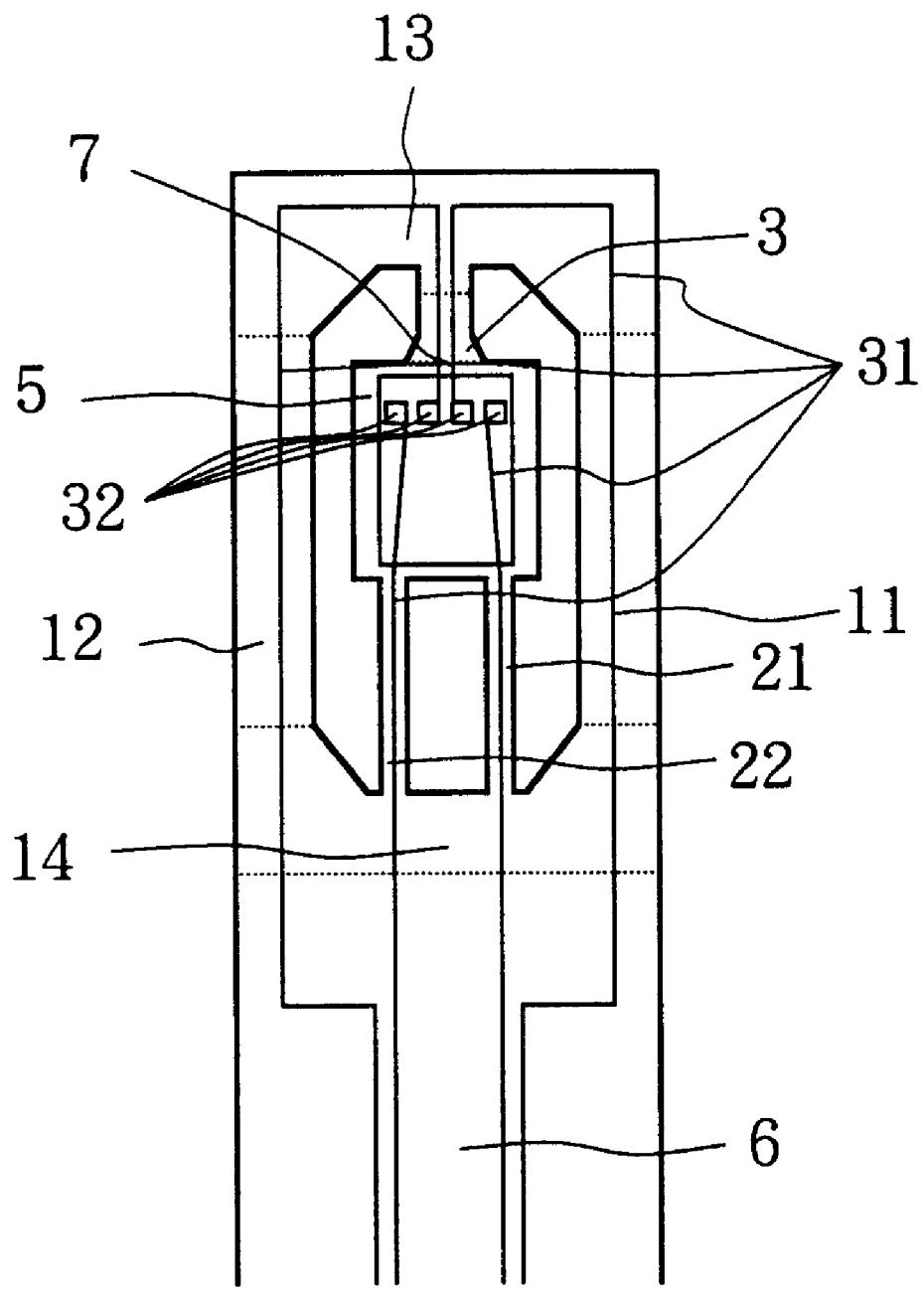
FIG. 13 is a similar view to FIG. 7, in which an electric print cable for receiving/transmitting an electric signal with respect to a magnetic head is formed on a beam suspension portion directly.
Figure 14:
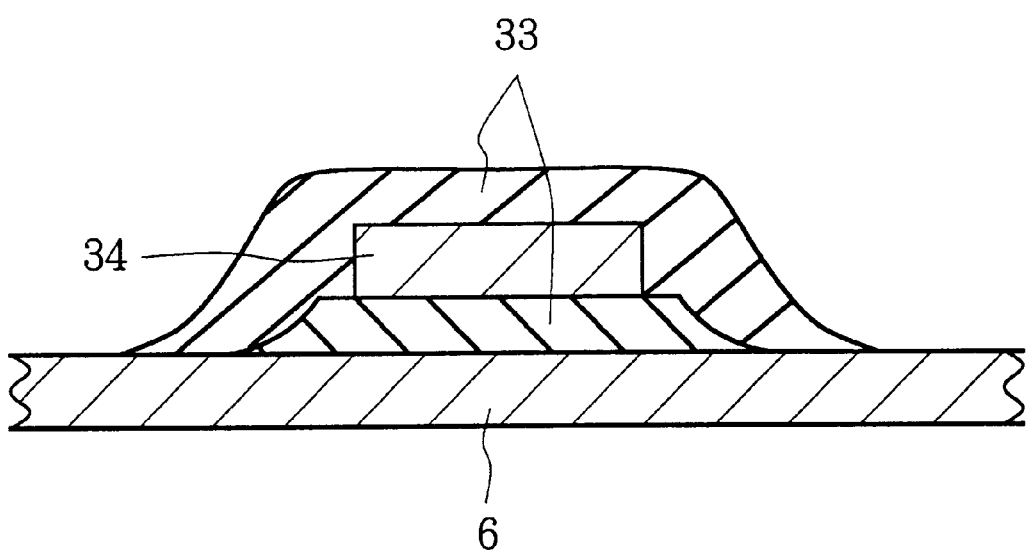
FIG. 14 is a cross sectional view of the beam suspension portion in FIG. 13.

FIG. 13 is a bottom view of another embodiment of the present invention, in which an electric print cable for receiving/sending an electric signal with respect to a magnetic head of a slide type magnetic head slider support mechanism shown in any of FIGS. 4 to 7 and 11 is formed directly on a beam suspension portion and FIG. 14 is a cross section of the beam suspension portion shown in FIG. 13. In this construction, the electric print cable 31 constructed with a conductor layer 34 electrically insulated by an insulating layer 33 is formed directly on the suspension portion 6. The electric contact of the print cable 31 with the magnetic head is performed on a back surface of the slider. With this wiring method, it is possible to restrict the degradation of tracking characteristics of the slide type magnetic head slider due to increased rigidity and vibration and the reduction of wiring tolerance due to lowered gap between the suspension and the magnetic recording medium caused by reduction of the thickness of slider, which are problems of the conventional wiring method in which conductors are derived from the magnetic head portion arranged on the side surface of the conventional slider.

By mounting the slide type magnetic head slider support mechanism having constructed as mentioned above in substantially parallel to the positioning actuator arm and the magnetic recording medium as shown in FIG. 8, it is possible to provide the magnetic disk device having an improved rigidity against torsional vibration compared with the conventional mechanism in which the head slider support mechanism is arranged with an angle with respect to the surface of the magnetic recording medium to utilize torsional flexion of the suspension and capable of positioning at high speed with high precision.

Figure 1:
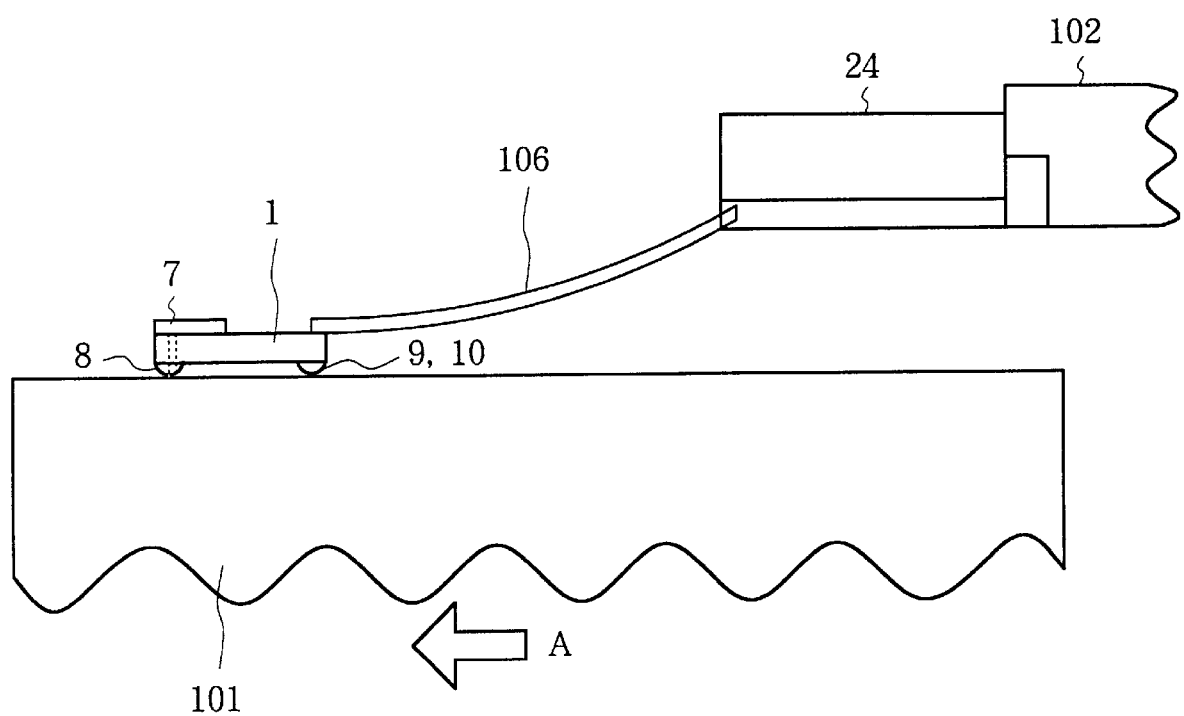
FIG. 1 is a cross sectional view schematically showing a basic construction of a conventional slide type magnetic disk device.
Figure 2:
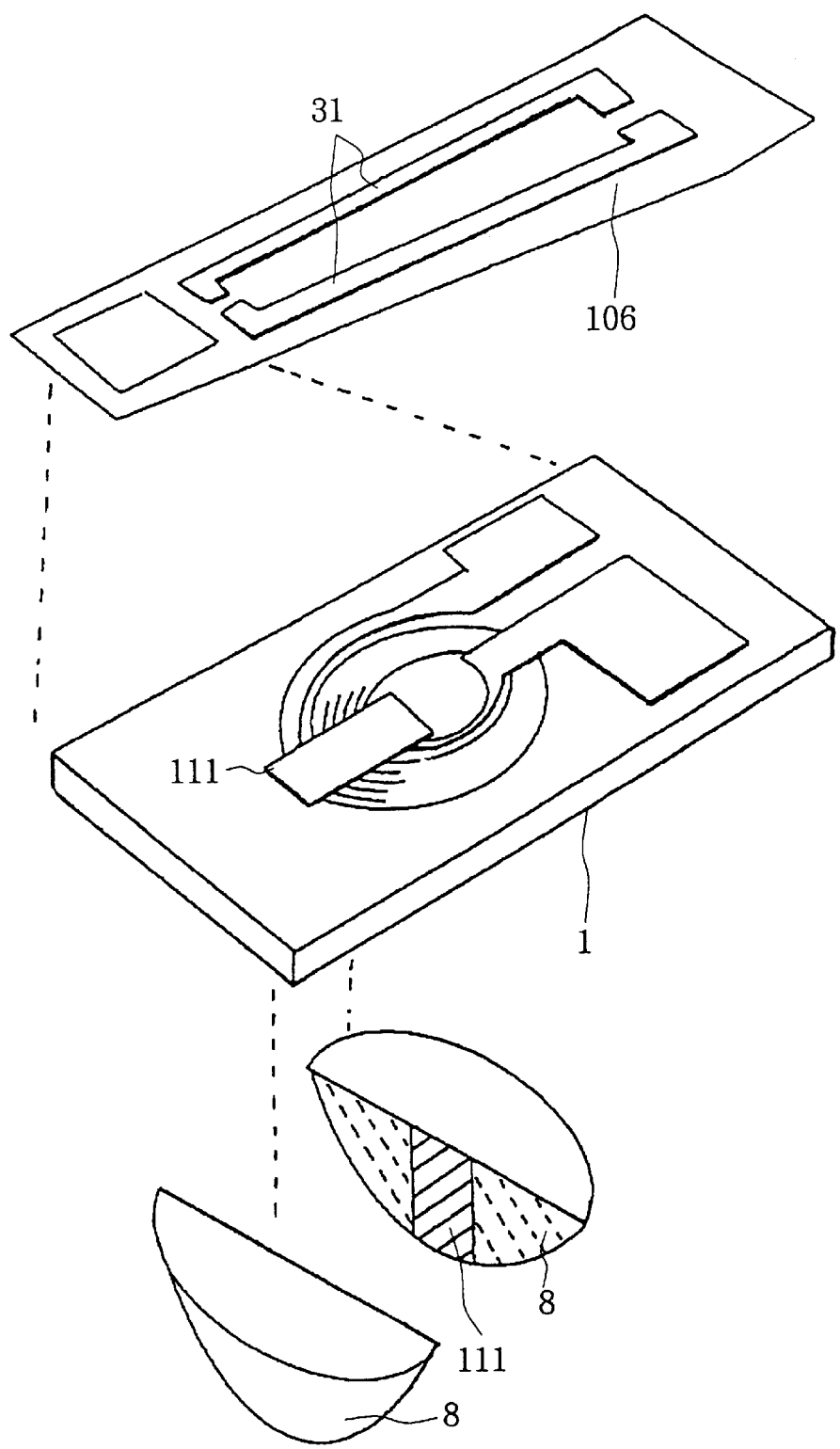
FIG. 2 is a disassembled perspective view of a magnetic head slider and a suspension spring used in the conventional slide type magnetic disk device.
Figure 3:
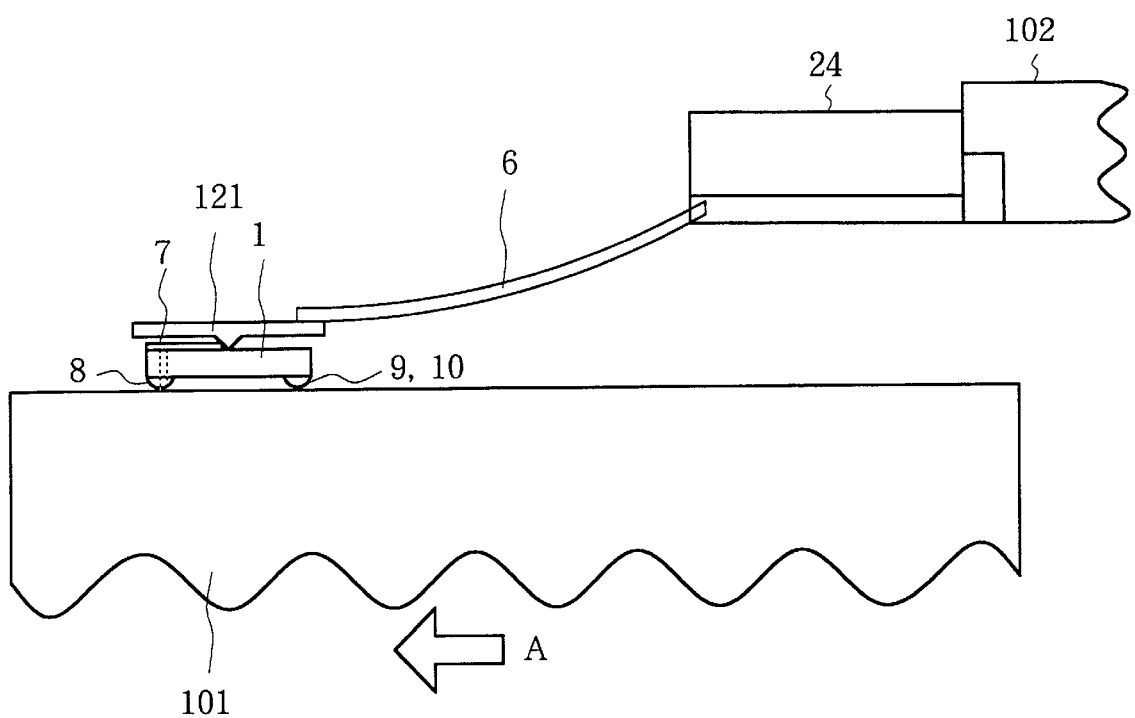
FIG. 3 is a cross sectional view showing a basic construction of another conventional slide type magnetic disk device having a gimbal mechanism on a suspension spring.

The use of the above described magnetic head slider support mechanism in a magnetic disk device is similar to that of the conventional construction shown in FIG. 1, in which case, the magnetic disk device is constructed with a magnetic head 7 for performing recording/reproducing operation with respect to a magnetic recording medium 101, a slide type magnetic head slider 1 on which the magnetic head 7 is mounted and a suspension spring 106 for supporting the slide type magnetic head slider 1. The suspension spring 106 is connected to a positioning actuator 102 through a positioning actuator arm 24.

The magnetic disk device may be additionally provided with a head load/unload mechanism for the slide type magnetic head slider support mechanism. With such a head load/unload mechanism, it becomes unnecessary to consider the attraction between the slider and the magnetic recording medium when the magnetic disk device is stopped to operate. Therefore, it is possible to realize a head-disk interface for highly flat surface of a magnetic recording medium and a large freedom of the lubricant on the magnetic recording medium. Thus, it is possible to provide a magnetic disk device for high recording/reproducing density with reduced jump.

As mentioned, the present invention relates to the slide type magnetic head slider support mechanism and, particularly, to the suspension portion thereof and materials forming the suspension portion are not limited specifically. The suspension portion may be modified in various manners within the scope of the present invention defined by the attached claims. The outer configuration of a magnetic disk device in which the slide type magnetic head slider support mechanism of the present invention is to be mounted, the number of magnetic recording disks used in the magnetic disk device and the size of the magnetic recording disk are not limited specifically. Further, the head load/unload mechanism for the slide type magnetic head slider support mechanism may be any provided that it can lift up the slider from the surface of the magnetic recording disk by a predetermined distance during a time for which the magnetic disk device is stopped to operate.

As described hereinbefore, it is possible, by using the slide type magnetic head slider support mechanism according to the present invention, to provide a magnetic disk device which is light weight, is superior in the characteristics for tracking a recording medium, and is capable of positioning the magnetic head at high speed with high accuracy.

What is claimed is:

1. A contacting type magnetic head slider support mechanism comprising:

a gimbal portion to support a magnetic head slider constructed such that at least a portion of the magnetic head slider is in contact with a magnetic recording medium when a recording/reproducing operation is performed with respect to the magnetic recording medium; and a beam suspension portion formed integrally with said gimbal portion to support said gimbal portion and to apply a load to said magnetic head slider, wherein said gimbal portion is configured to create a fulcrum at a position on the magnetic head slider where a magnetic head is mounted to the magnetic head slider, and rotational vibration generated in said gimbal portion occurs at the fulcrum.

2. A magnetic head slider support mechanism comprising:

a gimbal portion to support a magnetic head slider constructed such that at least a portion of said magnetic head slider is in contact with a magnetic recording medium when a recording/reproducing operation is performed with respect to said magnetic recording medium; and a beam suspension portion formed integrally with said gimbal portion to support said gimbal portion and to apply a load to said magnetic head slider, said gimbal portion including:

a slider mounting portion to mount a magnetic head slider;

first and second gimbal arm portions extending outward from opposite sides of said slider mounting portion and supporting said slider mounting portion, said first gimbal arm portion provided on a side of said slider mounting portion adapted to carry said magnetic head slider, and said second gimbal arm portion provided on a side of said slider mounting portion opposite said side adapted to carry said magnetic head slider; and a gimbal frame to support said first and second gimbal arm portions and to connect said first and second gimbal arm portions to said beam suspension portion, said first gimbal arm portion including a single gimbal arm having one end connected to said magnetic head mounting portion of said slider mounting portion and an other end connected to said gimbal frame, and said second gimbal arm portion including a plurality of gimbal arms each being thinner and longer than said first gimbal arm portion.

3. A magnetic head slider support mechanism as claimed in claim 2, wherein said gimbal frame includes a gimbal frame top connected to said first gimbal arm portion, a gimbal frame base to connect said second gimbal arm portion and said beam suspension portion, and gimbal frame arms to connect said gimbal frame top and said gimbal frame base, and wherein flexual rigidity of center portions of said gimbal frame arms is small.

4. A magnetic head slider support mechanism as claimed in claim 2, wherein said gimbal portion and said beam suspension portion, except said magnetic head slider, have substantially uniform thickness of 30 μm or less, and a distance between a mounting center of said magnetic head slider and a top of a positioning actuator arm on which said beam suspension is connected is 7.5 mm or less.

5. A magnetic head slider support mechanism as claimed in claim 2, wherein said gimbal portion and said beam suspension portion, except said magnetic head slider, have substantially uniform thickness of 30 μm or less, and a distance between a mounting center of said magnetic head slider and a top of a positioning actuator arm on which said beam suspension portion is connected is 5 mm or less.

6. A magnetic head slider support mechanism as claimed in claim 2, wherein at least one of said first and second gimbal arm portions is bent such that a surface of said slider mounting portion protrudes from a surface of said gimbal frame to the side of said magnetic head slider.

7. A magnetic head slider support mechanism as claimed in claim 2, wherein at least one slit is formed in said gimbal frame.

8. A magnetic head slider support mechanism as claimed in claim 7, wherein an inside portion of said slit of said gimbal frame is bent such that a surface of said slider mounting portion protrudes from a surface of said gimbal frame to the side of said magnetic head slider.

9. A magnetic head slider support mechanism as claimed in claim 2, wherein an electric print cable for receiving/sending electric signal with respect to said magnetic head is directly formed on said beam suspension portion.

10. A magnetic head slider support mechanism as claimed in claim 2, wherein said beam suspension portion is connected to said positioning actuator arm such that said beam suspension portion becomes substantially parallel to said surface of said magnetic recording medium.

* * * * *